(12) United States Patent
Nakajima

(10) Patent No.: US 12,494,680 B2
(45) Date of Patent: Dec. 9, 2025

(54) MOUNTING STRUCTURE FOR ELECTRIC MOTOR

(71) Applicant: TOYOTA JIDOSHA KABUSHIKI KAISHA, Toyota (JP)

(72) Inventor: Takeshi Nakajima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 186 days.

(21) Appl. No.: 18/461,638

(22) Filed: Sep. 6, 2023

(65) Prior Publication Data

US 2024/0162763 A1    May 16, 2024

(30) Foreign Application Priority Data

Nov. 16, 2022   (JP) ................................ 2022-183737

(51) Int. Cl.
  *H02K 1/18*       (2006.01)
(52) U.S. Cl.
  CPC .................... *H02K 1/185* (2013.01)
(58) Field of Classification Search
  CPC .......... H02K 15/22; H02K 15/02; H02K 1/16; H02K 5/24; H02K 1/185
  USPC ..................... 310/216.049, 216.125, 216.127
  See application file for complete search history.

(56) References Cited

U.S. PATENT DOCUMENTS

| 2001/0036414 | A1 | 11/2001 | Makino et al. |
| 2019/0305614 | A1 | 10/2019 | Ikura |

FOREIGN PATENT DOCUMENTS

| CN | 109937522 A | * | 6/2019 | ............... F16M 1/04 |
| JP | 2001-280249 A | | 10/2001 | |
| JP | 2005-304213 A | | 10/2005 | |
| JP | 2011-015478 A | | 1/2011 | |
| JP | 2022-092822 A | | 6/2022 | |
| WO | 2018/087887 A1 | | 5/2018 | |

* cited by examiner

*Primary Examiner* — Jose A Gonzalez Quinones
(74) *Attorney, Agent, or Firm* — SoraIP, Inc.

(57) ABSTRACT

A mounting structure for an electric motor including a stator core having a cylindrical shape along an axis, having a plurality of teeth in an inner peripheral portion, and having a plurality of holes in an outer peripheral portion at equal angular intervals about the axis, (a) the stator core is fastened to the case by bolts inserted through at least three fastening holes out of the plurality of holes, (b) by different fastened states between the stator core and the case by the bolts, respectively, the radial rigidity of the stator core attached to the case symmetry about the axis is broken, (c) polygon formed by connecting the fastening holes as viewed in the direction of the axis includes the axis.

7 Claims, 5 Drawing Sheets

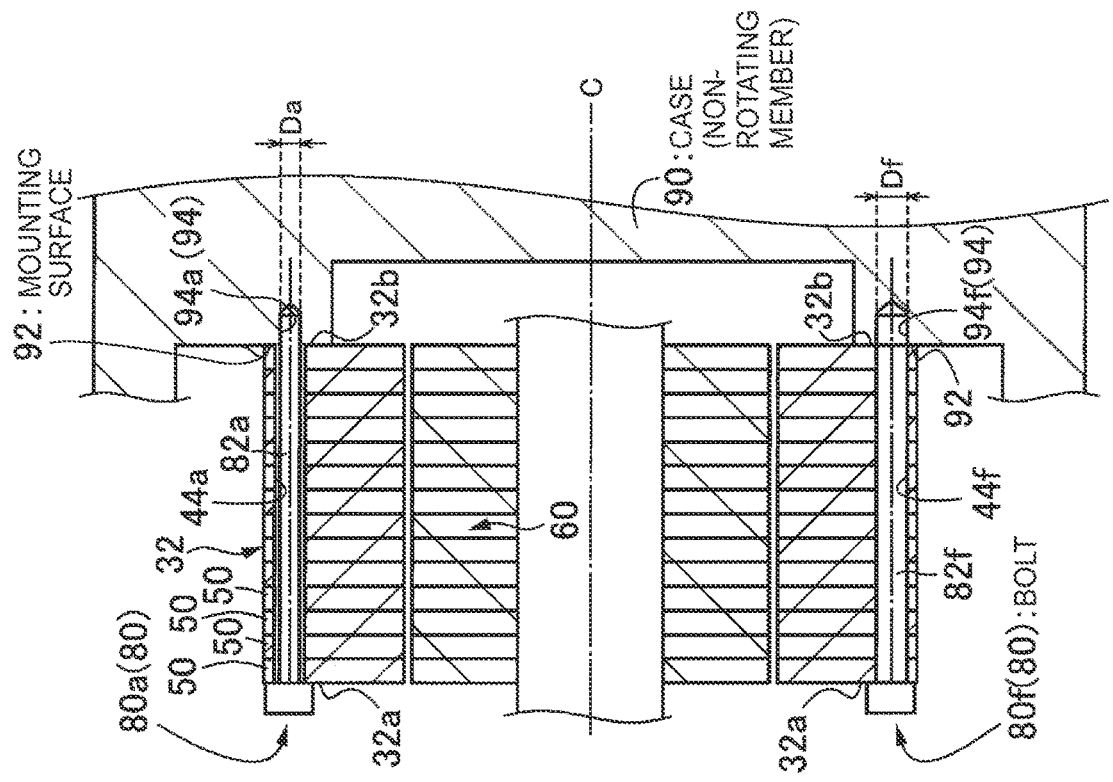
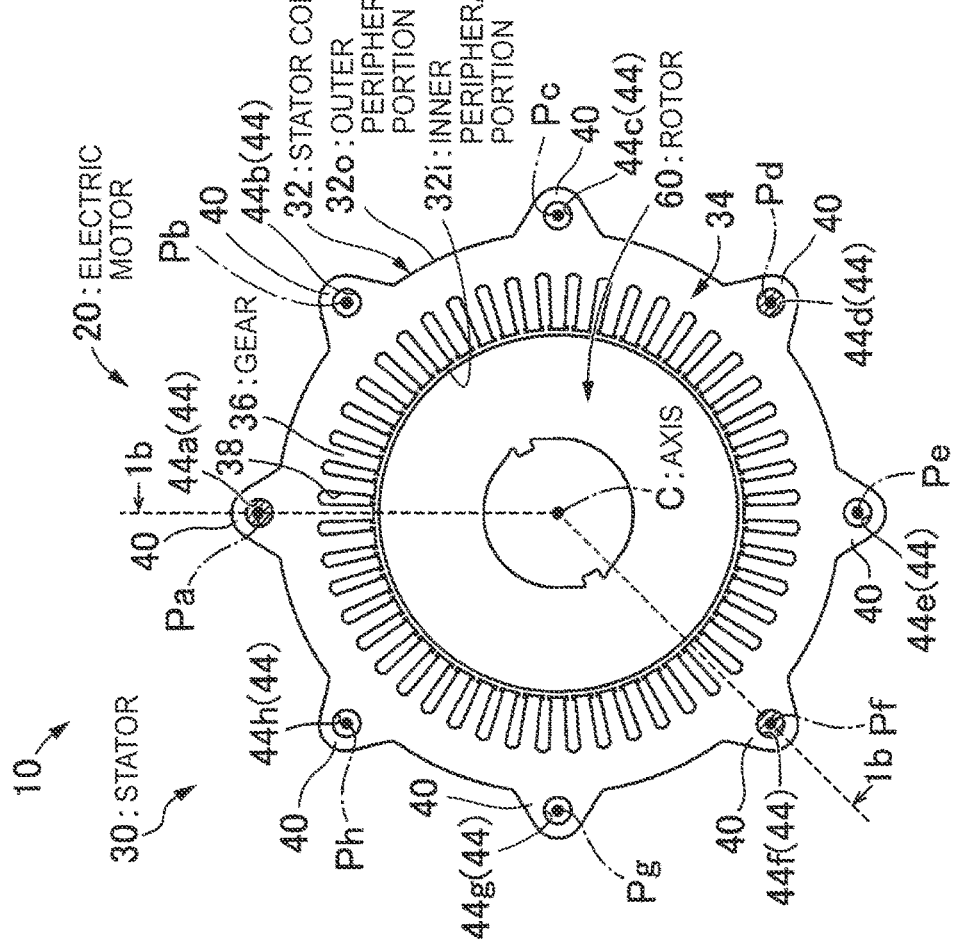

SECOND-ORDER VIBRATION MODE

THIRD-ORDER VIBRATION MODE

FOURTH-ORDER VIBRATION MODE

FIFTH-ORDER VIBRATION MODE

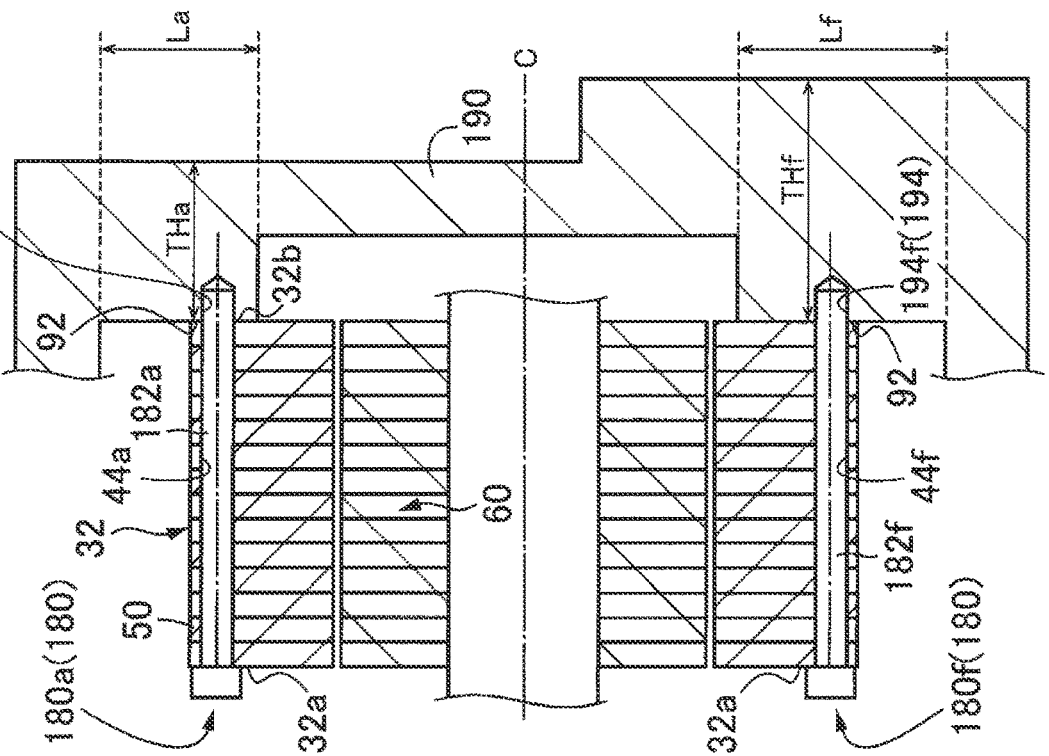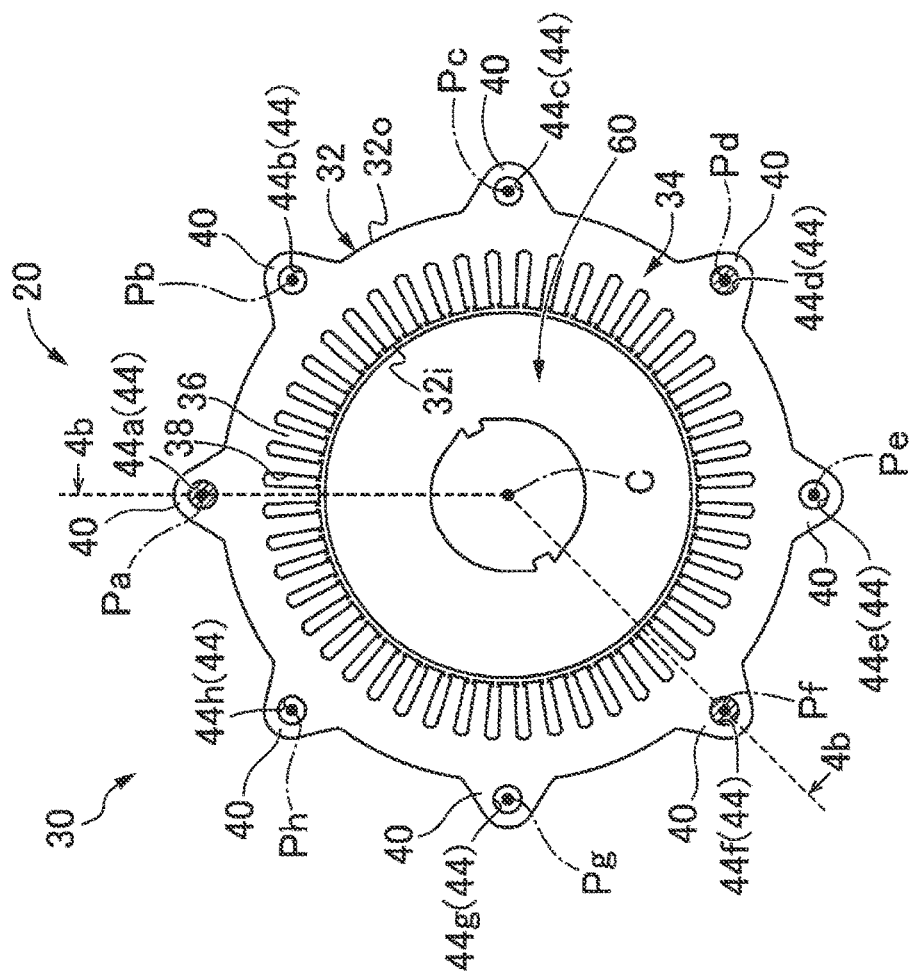

MOUNTING STRUCTURE FOR ELECTRIC MOTOR

CROSS-REFERENCE TO RELATED APPLICATION

This application claims priority to Japanese Patent Application No. 2022-183737 filed on Nov. 16, 2022, incorporated herein by reference in its entirety.

BACKGROUND

1. Technical Field

The present disclosure relates to mounting structures for mounting an electric motor to a non-rotating member.

2. Description of Related Art

When the number of magnetic poles of a rotor is the same as the number of bolts fastening a stator core to a case that is a non-rotating member, the stator core tends to resonate due to the electromagnetic force during rotation of the rotor. A mounting structure for an electric motor is known that reduces resonance by making the number of magnetic poles of the rotor different from the number of bolts fastening the stator core. An example of such a mounting structure is described in Japanese Unexamined Patent Application Publication No. 2001-280249 (JP 2001-280249 A).

SUMMARY

In the mounting structure for an electric motor described in JP 2001-280249 A, bolts are inserted through all of a plurality of holes formed at equal angular intervals in an outer peripheral portion of a stator core. Therefore, the radial rigidity of the stator core fastened to a case has such a periodic characteristic that the stator core has the same radial rigidity at every angular interval in the circumferential direction. When the radial rigidity of the stator core is periodic in the circumferential direction, resonance due to the annular vibration mode may occur. Also, the stator core needs to be stably fastened to the case by bolts.

The present disclosure was made in view of the above circumstances, and it is an object of the present disclosure to provide a mounting structure for an electric motor that can reduce resonance due to the annular vibration mode and can also stably fasten a stator core.

A mounting structure for an electric motor according to the present disclosure is a mounting structure for an electric motor, the electric motor including a stator core having a cylindrical shape about an axis and having a plurality of teeth in an inner peripheral portion of the stator core and a plurality of holes in an outer peripheral portion of the stator core, the holes being located at equal angular intervals about the axis, wherein
(a) the stator core is fastened to a non-rotating member by bolts inserted through at least three fastening holes out of the holes,
(b) symmetry of radial rigidity of the stator core about the axis in a state in which the stator core is mounted to the non-rotating member is broken due to at least one of the following: fastened states between the stator core and the non-rotating member by the bolts are different from each other; rigidities of the non-rotating member at a plurality of fastening positions where the stator core is fastened to the non-rotating member by the bolts are different from each other; and angular intervals between adjacent ones of the fastening holes about the axis as viewed in a direction of the axis are different from each other, and
(c) a polygon obtained by connecting the adjacent ones of the fastening holes as viewed in the direction of the axis includes the axis.

According to the mounting structure of the present disclosure,
(a) the stator core is fastened to the non-rotating member by the bolts inserted through at least three fastening holes out of the holes,
(b) symmetry of the radial rigidity of the stator core about the axis in the state in which the stator core is mounted to the non-rotating member is broken due to at least one of the following: the fastened states between the stator core and the non-rotating member by the bolts are different from each other; the rigidities of the non-rotating member at the fastening positions where the stator core is fastened to the non-rotating member by the bolts are different from each other; and the angular intervals between the adjacent ones of the fastening holes about the axis as viewed in the direction of the axis are different from each other, and
(c) a polygon obtained by connecting the adjacent ones of the fastening holes as viewed in the direction of the axis includes the axis.

Symmetry of the radial rigidity of the stator core about the axis is broken as described in (b), and a polygon obtained by connecting the adjacent ones of the fastening holes as viewed in the direction of the axis includes the axis as described in (c). With this configuration, resonance due to the annular vibration mode is reduced, and the stator core is stably fastened to the non-rotating member.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1A is a cross-sectional view of the electric motor mounting structure to the case according to a first embodiment, which is a cross-sectional view in the radial direction;

FIG. 1B is a cross-sectional view of the electric motor mounting structure to the case according to the first embodiment, and is an cross-sectional view in the direction of an axis;

FIG. 4A is a cross-sectional view of the electric motor mounting structure to the case according to a second embodiment, which is a cross-sectional view in the radial direction;

FIG. 4B is a cross-sectional view of the electric motor mounting structure to the case according to the second embodiment, which is a cross-sectional view in the direction of an axis;

DETAILED DESCRIPTION OF EMBODIMENTS

Figure 2A:
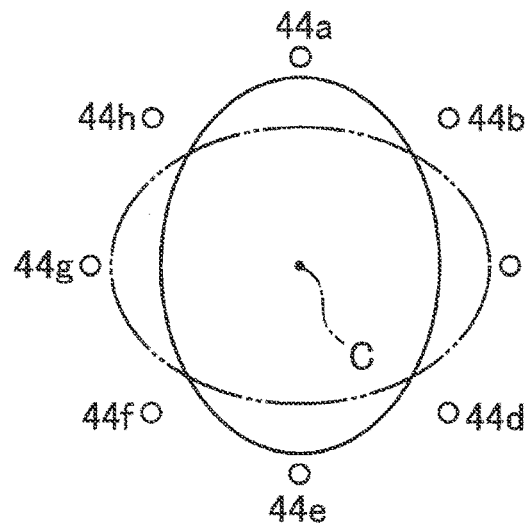
FIG. 2A is a diagram showing an annular vibration mode of integer-order, illustrating a second-order vibration mode.

Hereinafter, embodiments of the present disclosure will be described in detail with reference to the drawings. Note that, in the embodiments, the drawings are appropriately simplified or modified, and the dimensional ratios, shapes, and the like of the respective portions are not necessarily drawn accurately. In the present specification, the "direction parallel to the axis C", "radial direction of the stator core", and "circumferential direction of the stator core" are simply referred to as "axis C direction", "radial direction", and "circumferential direction", respectively.

First Embodiment

FIGS. 1A and 1B are cross-sectional views of the mounting structure of the electric motor 20 to the case 90 according to the first embodiment, FIG. 1A is a cross-sectional view in the radial direction, and FIG. 1B is a cross-sectional view in the direction of the axis C. Note that, in FIGS. 1A and 1B, the electric motor 20 is fastened to the case 90 in the manner of FIG. 3A to be described later. FIG. 1B is a cross-sectional view taken along 1$b$-1$b$ of the cut line shown in FIG. 1A. In FIG. 1A shown, the case 90 and the bolt 80 are not shown.

The electric motor 20 is, for example, a rotary electric machine having a function as an electric motor and a function as a generator mounted on the vehicles 10 such as a hybrid electric vehicle and a battery electric vehicle, and is a so-called motor generator. The electric motor 20 is, for example, a driving force source for traveling of the vehicle 10.

The axis C is a rotation center line of the rotor 60. For example, the electric motor 20 is an AC-driven Interior Permanent Magnet (IPM) Motor including a stator 30 having a cylindrical shape about an axis C and a rotor 60 disposed on the inner periphery of the stator 30.

The stator 30 includes a stator core 32 and a winding (not shown) wound around the stator core 32.

The stator core 32 has, for example, a cylindrical shape in which a plurality of electromagnetic steel sheets 50 is stacked and the axis C is the center. On the inner peripheral portion 32$i$ of the stator core 32, a plurality of (48 in the present embodiment) grooves or slots 38 having a depth in a direction toward the outer peripheral side in the radial direction and penetrating in the direction of the axis C is provided at equal angular intervals. In the present embodiment, the distance is at equal angular intervals of $2\pi/48$ [rad]. Teeth 36 are formed between adjacent slots 38. The teeth 36 generate a rotating magnetic field as an electromagnet when an alternating current is applied to the above-described winding. As described above, the stator core 32 has a plurality of teeth 36 on the inner peripheral portion 32$i$ thereof.

A portion of the stator core 32 other than the teeth 36, which is a path of the magnetic field lines between the tooth portions 36 becoming electromagnets is a yoke 34.

A plurality of holes 44 penetrating in the direction of the axis C is provided on the outer peripheral portion 32$o$ of the stator core 32. When viewed in the direction of the axis C, positions Pa to Ph from the center position of the plurality of holes 44 are eight positions located symmetrically about the axis C at equal angular intervals ($2\pi/8$ [rad] in the present embodiment) about the axis C. The radial distances from the axis C to the positions Pa to Ph are the same. Each of the plurality of holes 44 is 44$h$ from a cylindrical hole 44$a$ having the same diameter around Ph from the position Pa. In the same manner, a to h are assigned to the end of the sign of the configuration of the position corresponding to Ph from the position Pa. Thus, each of the plurality of holes 44 has the same shape. The plurality of holes 44 are provided in each of the protruding portions 40. The protruding portion 40 partially protrudes outward in the radial direction on the outer peripheral portion 32$o$ of the stator core 32 and extends in the direction of the axis C. The plurality of holes 44 are opened at one end face 32$a$ and the other end face 32$b$ of the stator core 32 in the direction of the axis C.

The case 90 is a non-rotating member. The case 90 is made of, for example, an aluminum alloy manufactured by casting. The case 90 has, for example, a bottomed cylindrical shape, and is a transmission case (=a case for accommodating a vehicle transmission) in which the stator 30 and the rotor 60 of the electric motor 20 are accommodated. A mounting surface 92 to which the electric motor 20 is mounted is provided on an inner surface of the case 90. The mounting surface 92 is provided with a plurality of holes 94, and the plurality of holes 94 are respectively provided at positions corresponding to the plurality of holes 44. The case 90 corresponds to a "non-rotating member" in the present disclosure.

Here, the "fastening hole 44$x$" corresponds to one of the plurality of holes 44 in which the bolt 80 is inserted and the stator core 32 is fastened to the case 90. The "dummy hole 44$y$" refers to a plurality of holes 44 in which the bolts 80 are not inserted and the stator core 32 is not fastened to the case 90. Further, the "locking hole 94$x$" corresponds to a hole provided corresponding to the position of the fastening hole 44$x$ among the plurality of holes 94. The "non-locking hole 94$y$" corresponds to a hole that is provided corresponding to the position of the dummy hole 44$y$ among the plurality of holes 94. An internal thread is formed on the inner peripheral surface of the locking-hole 94$x$. The "locking-hole 94$x$" is a fastening position in the case 90 where the stator core 32 is fastened by the bolt 80.

In the present embodiment, the fastening hole 44$x$ is a hole 44$a$, 44$d$, 44$f$, and the dummy hole 44$y$ is a hole 44$b$, 44$c$, 44$e$, 44$g$, 44$h$. Further, the locking hole 94$x$ is a hole 94$a$, 94$d$, 94$f$, and the non-locking hole 94$y$ is a hole 94$b$, 94$c$, 94$e$, 94$g$, 94$h$. In FIG. 1A, the fastening hole 44$x$ is shaded. There are at least three sets of fastening holes 44$x$ and locking holes 94$x$. When viewed in the direction of the axis C, a polygon (=an area surrounded by the sides of the polygon and including the sides) formed by connecting the adjoining fastening holes 44$x$ to each other includes the axis C. Since the polygon includes the axis C, which is the center of gravity of the electric motor 20 as viewed along the axis C, the stator core 32 is stably fastened to the case 90 by the bolt 80 that passes through the fastening hole 44x.

An annular vibration mode will now be described.

As described above, when the electric motor 20 is driven by an alternating current, each of the teeth 36 becomes an electromagnet to generate a rotating magnetic field. When the rotor 60 is attracted or repelled by the rotating magnetic field, the rotor 60 rotates. On the other hand, an electromagnetic force in the radial direction acts on the stator core 32 by a force received from the rotor 60. Due to the radial electromagnetic force acting on the stator core 32, the stator core 32 vibrates in the radial direction. The radial vibration (resonance) of the stator core 32 includes an annular vibration mode having an integer order.

Figure 2B:
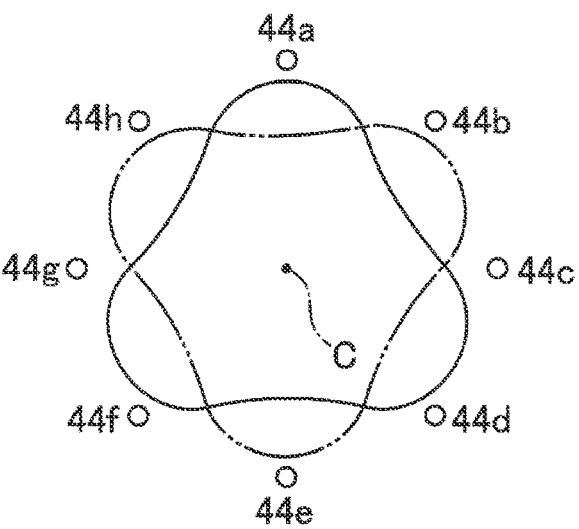
FIG. 2B is a diagram showing an annular vibration mode of integer-order, illustrating a third-order vibration mode.
Figure 2C:
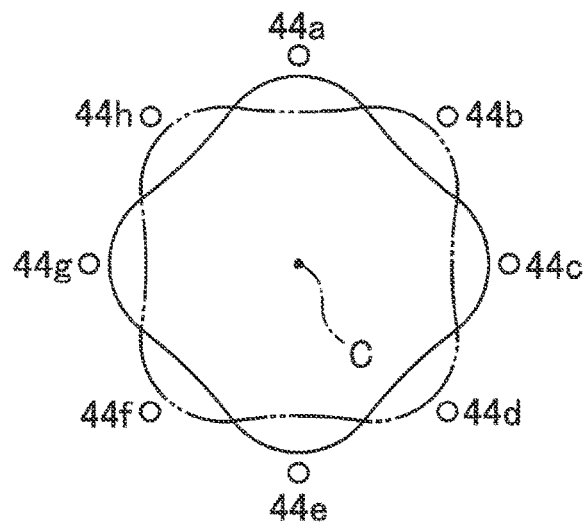
FIG. 2C is a diagram showing an annular vibration mode of integer-order, illustrating a fourth-order vibration mode.
Figure 2D:
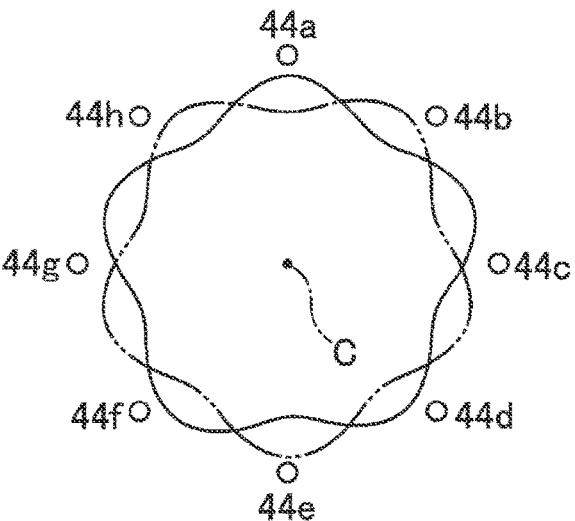
FIG. 2D is a diagram showing an annular vibration mode of integer-order, illustrating a fifth-order vibration mode.

FIGS. 2A to 2D show an integral-order annular vibration mode. FIG. 2A is a diagram illustrating the second-order vibration mode (=integer order is "2"), FIG. 2B is a diagram illustrating the third-order vibration mode (=integer order is "3"), FIG. 2C is a diagram illustrating the fourth-order vibration mode (=integer order is "4"), and FIG. 2D is a diagram illustrating the fifth-order vibration mode (=integer order is "5"). In FIGS. 2A to 2D, a schematic diagram showing a state of a radial cross section of the stator core 32 at one time point and a schematic diagram showing a state of a radial cross section of the stator core 32 at another time point are shown by solid lines and two-dot chain lines, respectively.

In the resonance by the annular vibration mode, the abdomen in which the stator core 32 expands or contracts in the radial direction and the node in which the stator core 32 hardly expands or contracts in the radial direction appear periodically in the circumferential direction. The abdomen is a portion where the radial vibration of the stator core 32 is large, and the nodal portion is a portion where the radial vibration of the stator core 32 is smaller than the abdomen. Each of the number of abdomens and the number of nodules is twice the integer order in the annular vibration mode. In addition, in any of the integer-order annular vibration modes, the abdominal portions and the nodal portions are in point-symmetric positions with respect to the axis C. When the integral order is an even number as in the second-order vibration mode and the fourth-order vibration mode, when the radial cross-section of the stator core 32 is rotated by $\pi$ [rad] about the axis C, the portions of the abdomen where the stator core 32 expands in the radial direction and the portions of the abdomen which contract in the radial direction coincide with each other. When the integer order is an odd number as in the third-order vibration mode and the fifth-order vibration mode, the radial cross-section of the stator core 32 is rotated by $\pi$ [rad] about the axis C. Then, the portion of the abdomen where the stator core 32 expands in the radial direction coincides with the portion of the abdomen where the stator core contracts in the radial direction.

In the stator core 32 mounted to the case 90, the radial rigidity is relatively high at the position of the fastening hole 44x fastened by the bolt 80, and the radial rigidity is relatively low at the position of the dummy hole 44y not fastened by the bolt 80. This is because when the stator core 32 is fastened to the case 90 by the bolt 80, the stator core 32 is less likely to be deformed at a position fastened to the case 90 as compared with a position not fastened to the case 90.

For example, when the rigidity in the radial direction in the fastening hole 44x is the same and the rigidity in the radial direction of the stator core 32 mounted to the case 90 is periodic in the circumferential direction, resonance due to the annular vibration mode corresponding to the periodicity in the circumferential direction of the rigidity in the radial direction of the stator core 32 is likely to occur.

For example, the radial rigidity in the fastening hole 44x may be the same, and the radial rigidity of the stator core 32 mounted to the case 90 may be symmetrical with respect to any line passing through the axis C. In this case, resonance due to an annular vibration mode of an integer order in which the abdomen and the node portion are point-symmetric about the axis C is likely to occur.

Figure 3A:
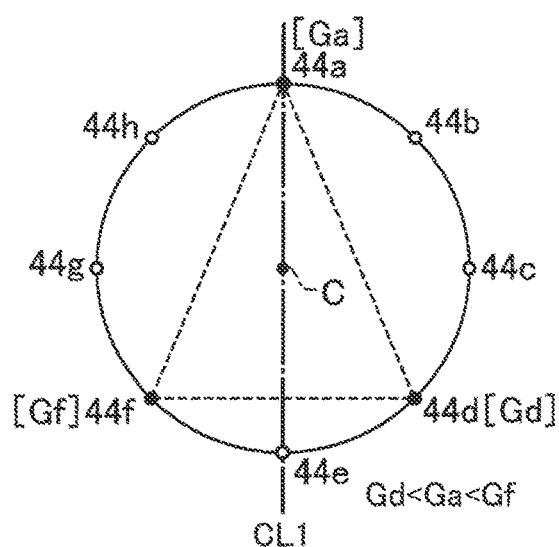
FIG. 3A is a view for explaining the radial rigidity of the stator core fastened to a case when three fastening holes are arranged symmetrically with respect to a line passing through the axis as viewed in the direction of the axis.
Figure 3B:
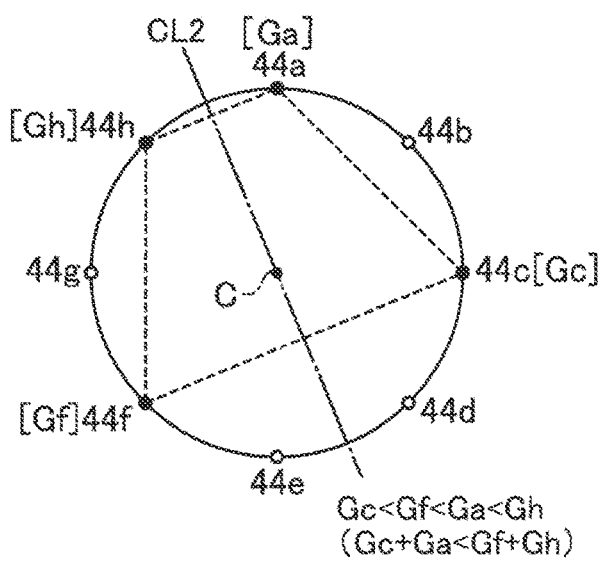
FIG. 3B is a view illustrating the radial rigidity of a stator core fastened to a case when four fastening holes are arranged symmetrically with respect to a line passing through an axis as viewed in the direction of the axis.
Figure 3C:
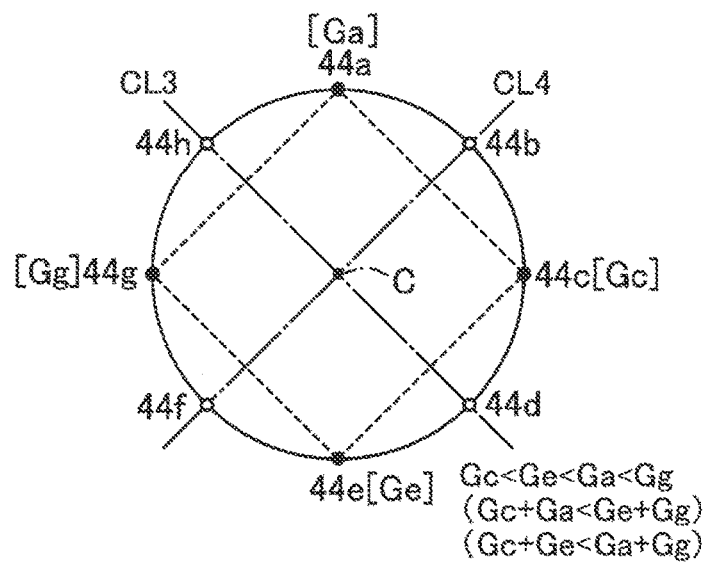
FIG. 3C shows a view for explaining the radial rigidity in the stator core fastened to the case, where the angular intervals between adjacent ones of the fastening holes about the axis as viewed in the direction of the axis are the same.

FIGS. 3A to 3C are diagrams for explaining the radial rigidity of the stator core 32 fastened to the case 90. In FIG. 3A, three fastening holes 44x are arranged symmetrically with respect to a line CL1 passing through the axis C as viewed along the axis C. In FIG. 3B, four fastening holes 44x are arranged symmetrically with respect to a line CL2 passing through the axis C as viewed in the direction of the axis C. In FIG. 3C, four fastening holes 44x are arranged at the same angular intervals about the axis C between the fastening holes 44x adjoining each other as viewed in the direction of the axis C.

In the present embodiment, the fastened state of the stator core 32 and the case 90 by the bolt 80 is different at each fastening position. The "fastened states are different" means a fastened state in which the radial rigidity of the stator core 32 mounted to the case 90 is different when the stator core 32 is fastened to the case 90 by the bolt 80. For example, the bolts 80 through which the fastening holes 44x are respectively inserted have substantially the same configuration (the same material). However, the outside diameters D [mm] of the shaft portions 82 of the bolts 80 are different from each other, and the axial force (=tightening force) F[N] of the bolts 80 in a state where the stator core 32 is mounted to the case 90 is different from each other. The bolt 80 includes, for example, a shaft portion 82 that can be inserted into the fastening hole 44x, and a head portion that is larger in diameter than the diameter of the fastening hole 44x and is provided at one end of the shaft portion 82.

Here, an example in which the outside diameter D of the shaft portion 82 of the bolt 80 is different at each fastening position will be described. As the outside diameter D differs, the diameter of the locking hole 94x also differs.

In the case illustrated in FIG. 3A, the holes 44a, 44d, and 44f out of the plurality of holes 44 are the fastening holes 44x, and the holes 44b, 44c, 44e, 44g, 44h are the dummy holes 44y. The outside diameters D of the bolts 80a, 80d, and 80f inserted through the fastening holes 44x are defined as outside diameters Da, Dd, and Df. Of the outside diameters Da, Dd, and Df, the outside diameter Df is the largest, the outside diameter Dd is the smallest, and the outside diameter Da is a diameter therebetween. Here, the moduli of radial rigidity G at the positions of the fastening holes 44x in the stator core 32 mounted to the case 90 are defined as moduli of rigidity Ga, Gd, and Gf. The modulus of rigidity G is a physical property value representing difficulty in deformation, and is less likely to be deformed as the modulus of rigidity G is higher. Since the larger the outside diameter D of the bolt 80 is, the more difficult it is to deform and the higher the modulus of rigidity G is. Therefore, of the moduli of rigidity Ga, Gd, and Gf, the modulus of rigidity Gf is the highest, the modulus of rigidity Gd is the lowest, and the modulus of rigidity Ga is a value therebetween. As a result, the radial rigidity of the stator core 32 mounted to the case 90 is not symmetrical about the axis C. The phrase "the symmetry around the axis C is broken" means that the symmetry is not periodic in the circumferential direction and is not symmetrical with respect to any line passing through the axis C. For example, one side and the other side are different from each other in modulus of rigidity G with respect to a line CL1 passing through the axis C shown in FIG. 3A, so that the symmetry is broken.

In the cases illustrated in FIG. 3B, the holes 44a, 44c, 44f, and 44h out of the plurality of holes 44 is the fastening holes 44x, and the holes 44b, 44d, 44e, and 44g is the dummy holes 44y. The outside diameters D of the bolts 80a, 80c, 80f, and 80h inserted through the fastening holes 44x are outside diameters Da, Dc, Df, and Dh. Of the outside diameter Da, Dc, Df, and Dh, the outside diameter Dh is the largest, the outside diameter Da is the second largest, the outside diameter Df is the third largest, and the outside diameter Dc is the smallest. Here, the moduli of rigidity G at the positions of the fastening holes 44x in the stator core 32 mounted to the case 90 are defined as moduli of rigidity Ga, Gc, Gf, and Gh. Of the moduli of rigidity Ga, Gc, Gf, and Gh, the modulus of rigidity Gh is the highest, the modulus of rigidity Ga is the second highest, the modulus of rigidity Gf is the third highest, and the modulus of rigidity Gc is the lowest. As a result, symmetry of the radial rigidity of the stator core 32 mounted to the case 90 about the axis C is broken. For example, one side and the other side are different from each other in modulus of rigidity G with respect to a line CL2 passing through the axis C shown in FIG. 3B, so that the symmetry is broken.

In the case illustrated in FIG. 3C, the hole 44a, 44c, 44e, and 44g out of the plurality of holes 44 is the fastening hole 44x, and the hole 44b, 44d, 44f, 44h is the dummy hole 44y. Here, the outside diameters D of the bolts 80a, 80c, 80e, and 80g inserted though the fastening holes 44x are outside diameters Da, Dc, De, and Dg. Of the outside diameters Da, Dc, De, and Dg, the outside diameter Dg is the largest, the outside diameter Da is the second largest, the outside diameter De is the third largest, and the outside diameter Dc is the smallest. Here, the moduli of radial rigidity G at the positions of the fastening holes 44x in the stator core 32 mounted to the case 90 are defined as moduli of rigidities Ga, Gc, Ge, and Gg. Of the moduli of rigidity Ga, Gc, Ge, and Gg, the modulus of rigidity Gg is the highest, the modulus of rigidity Ga is the second highest, the modulus of rigidity Ge is the third highest, and the modulus of rigidity Gc is the lowest. As a result, symmetry of the radial rigidity of the stator core 32 mounted to the case 90 about the axis C is broken. For example, one side and the other side of the line CL3 and the line CL4 passing through the axis C shown in FIG. 3C have different moduli of rigidity G from each other, and the symmetry is broken.

Here, an example in which the axial force F of the bolt 80 is different at each fastening position will be described.

First, the cases shown in FIG. 3A will be described. Here, the axial force F of the bolt 80a, 80d, 80f through which the fastening hole 44x is inserted is referred to as an axial force Fa, Fd, Ff. Among the axial force Fa, Fd, Ff, the axial force Ff is the largest, the axial force Fd is the smallest, and the axial force Fa is the value between them. The larger the axial force F of the bolt 80 is, the more difficult it is to deform and the higher the modulus of rigidity G is. Therefore, of the modulus of rigidities Ga, Gd, and Gf, the modulus of rigidity Gf is the highest, the modulus of rigidity Gd is the lowest, and the modulus of rigidity Ga is a value therebetween. As a result, symmetry of the radial rigidity of the stator core 32 mounted to the case 90 about the axis C is broken.

Next, cases shown in FIG. 3B will be described. The axial forces F of the bolts 80a, 80c, 80f, and 80h inserted through the fastening holes 44x are defined as axial forces Fa, Fc, Ff, and Fh, respectively. Of the axial forces Fa, Fc, Ff, and Fh, the axial force Fh is the largest, the axial force Fa is the second largest, the axial force Ff is the third largest, and the axial force Fc is the smallest. As a result, symmetry of the radial rigidity of the stator core 32 mounted to the case 90 about the axis C is broken.

Next, cases shown in FIG. 3C will be described. The axial forces F of the bolts 80a, 80c, 80e, and 80g inserted through the fastening holes 44x are defined as axial forces Fa, Fc, Fe, and Fg, respectively. Of the axial forces Fa, Fc, Fe, and Fg, the axial force Fg is the largest, the axial force Fa is the second largest, the axial force Fe is the third largest, and the axial force Fc is the smallest. As a result, symmetry of the radial rigidity of the stator core 32 mounted to the case 90 about the axis C is broken.

In the present embodiment, since the fastened states of the stator core 32 and the case 90 by the bolts 80 inserted through the fastening holes 44x are different from each other, symmetry of the radial rigidity of the stator core 32 mounted to the case 90 about the axis C is broken.

According to the present embodiment, (a) the stator core 32 is fastened to the case 90 by bolts 80 inserted through three or four fastening holes 44x out of the plurality of holes 44, (b) by the fastened states of the stator core 32 and the case 90 by the bolts 80 are different, the radial rigidity of the stator core 32 mounted to the case 90 about the axis C is broken, and (c) a polygon obtained by connecting adjacent ones of the fastening holes 44x as viewed in the direction of the axis C include the axis C. As described above (b), the radial rigidity of the stator core 32 is symmetrical about the axis C, and the polygon formed by connecting the fastening holes 44x adjoining each other as viewed in the direction of the axis C as described above (c) includes the axis C. As a result, resonance due to the annular vibration mode is reduced and the stator core 32 is stably fastened to the case 90 as compared to the case where the fastened states between the stator core 32 and the case 90 by the bolts 80 inserted through the fastening holes 44x are the same.

According to the present embodiment, when the arrangement of the fastening hole 44x is symmetrical with respect to a line passing through the axis C in the direction of the axis C (for example, CL4 from the line CL1), the fastened states of the stator core 32 and the case 90 by the bolts 80 are different from each other, symmetry of the radial rigidity of the stator core 32 mounted to the case 90 about the axis C is broken. Thus, resonance due to the annular vibration mode is reduced, and the stator core 32 is stably fastened to the case 90.

According to the present embodiment, either one of the outside diameter D of each of the bolts 80 passing through the fastening hole 44x and the axial force F of each of the bolts 80 passing through the fastening hole 44x is different, so that the fastened states of the stator core 32 and the case 90 by the bolts 80 are different from each other. The fastened states are different in a simple configuration in which the outside diameter D of the bolt 80 is different or the axial force F of the bolt 80 is different. Thus, resonance due to the annular vibration mode is reduced, and the stator core 32 is stably fastened to the case 90.

Second Embodiment

FIGS. 4A and 4B are cross-sectional views of the mounting structure of the electric motor 20 to a case 190 according to a second embodiment, where FIG. 4A is a cross-sectional view in a radial direction, and FIG. 4B is a cross-sectional view in a C-axis direction. The mounting structure of the electric motor 20 to the case 190 according to the present embodiment is substantially the same as the mounting structure of the electric motor 20 to the case 90 according to the first embodiment described above. Therefore, in the present embodiment, portions different from those of the first embodiment will be mainly described, and portions substantially the same as those of the first embodiment will be denoted by the same reference numerals, and description thereof will be omitted as appropriate.

In FIGS. 4A and 4B, the electric motor 20 is fastened to the case 190 in a manner in which the position of the fastening hole 44x is the same as FIG. 3A described above. FIG. 4B is a cross-sectional view taken along 4b-4b of the cut line shown in FIG. 4A. In FIG. 4A, the case 190 and the bolt 180 are not illustrated.

In the present embodiment, the case 90 and the bolt 80 in the first embodiment are replaced with the case 190 and the bolt 180, respectively. The outside diameters D of the shaft portions 182 of the bolts 180 through which the fastening holes 44x are respectively inserted are all the same. The locking holes 194x provided in the case 190 are located at the same positions as the locking holes 94x in the first embodiment, and all the locking holes 194x have the same diameter.

For example, the thickness TH [mm] in the direction of the axis C at the fastening position in the case 190 (hereinafter, referred to as "thickness TH") is different from each other, or the length L [mm] in the radial direction of a region where the thickness at the fastening position in the case 190 is thicker than the periphery thereof (hereinafter, referred to as "thick region") is different from each other. For example, the difference in the thickness TH and the radial length L of the thick region depends on the presence or absence of a ribbed portion formed for reinforcement in the case 190.

A case in which the thickness TH of the case 190 is different for each fastening position will be described below.

First, the position of the fastening hole 44x will be described in the same manner as in FIG. 3A. The thicknesses TH of the case 190 at the fastening positions, that is, at the locking holes 194x, are defined as thicknesses THa, THd, and THf. The radial lengths L of the thick regions of the case 190 at the fastening positions are defined as lengths La, Ld, and Lf. Of the thicknesses THa, THd, and THf, the thickness THf is the largest, the thickness THd is the smallest, and the thickness THa has a value therebetween. Of the lengths La, Ld, and Lf, the length Lf is the largest, the length Ld is the smallest, and the length La has a value therebetween. The larger the thickness TH, the more difficult it is to deform and the higher the modulus of rigidity G. Further, the longer the length L, the more difficult it is to deform, and the higher the modulus of rigidity G. Therefore, of the moduli of rigidity Ga, Gd, and Gf, the modulus of rigidity Gf is the highest, the modulus of rigidity Gd is the lowest, and the modulus of rigidity Ga is a modulus of rigidity therebetween. As a result, symmetry of the radial rigidity of the stator core 32 mounted to the case 90 about the axis C is broken.

Although not described, the positions of the fastening holes 44 are in the same manner as in FIG. 3B and in the same manner as in FIG. 3C. By making the thickness TH of the case 190 different for each fastening position or making the length L in the radial direction of the thick region at the fastening position in the case 190 different, symmetry of the radial rigidity of the stator core 32 mounted to the case 190 about the axis C is broken.

According to the present embodiment, (a) the stator core 32 is fastened to the case 190 by bolts 180 inserted through three or four fastening holes 44x out of the plurality of holes 44, (b) the stator core 32 by different rigidity of the position of the locking hole 194x in the case 190 fastened by the bolts 180, symmetry of the radial rigidity of the stator core 32 mounted to the case 190 about the axis C is broken, and (c) a polygon obtained by connecting the fastening holes 44x as viewed in the direction of the axis C includes the axis C. As a result, the stator core 32 is stably fastened to the case 190 while reducing resonance due to the annular vibration mode as compared to the case where the rigidities of the case 190 at the positions of the locking holes 194x are the same.

According to the present embodiment, the respective thickness TH at the fastening positions in the case 190 and the respective radial lengths L of the thick regions in the case 190 are different from each other. With a simple configuration in which the thicknesses TH at the fastening positions in the case 190 are different from each other or the length L in the radial direction of the thick region is different from each other, symmetry of the radial rigidity of the stator core 32 mounted to the case 190 about the axis C is broken. As a result, resonance due to the annular vibration mode is reduced, and the stator core 32 is stably fastened to the case 190.

Third Embodiment

Figure 5B:
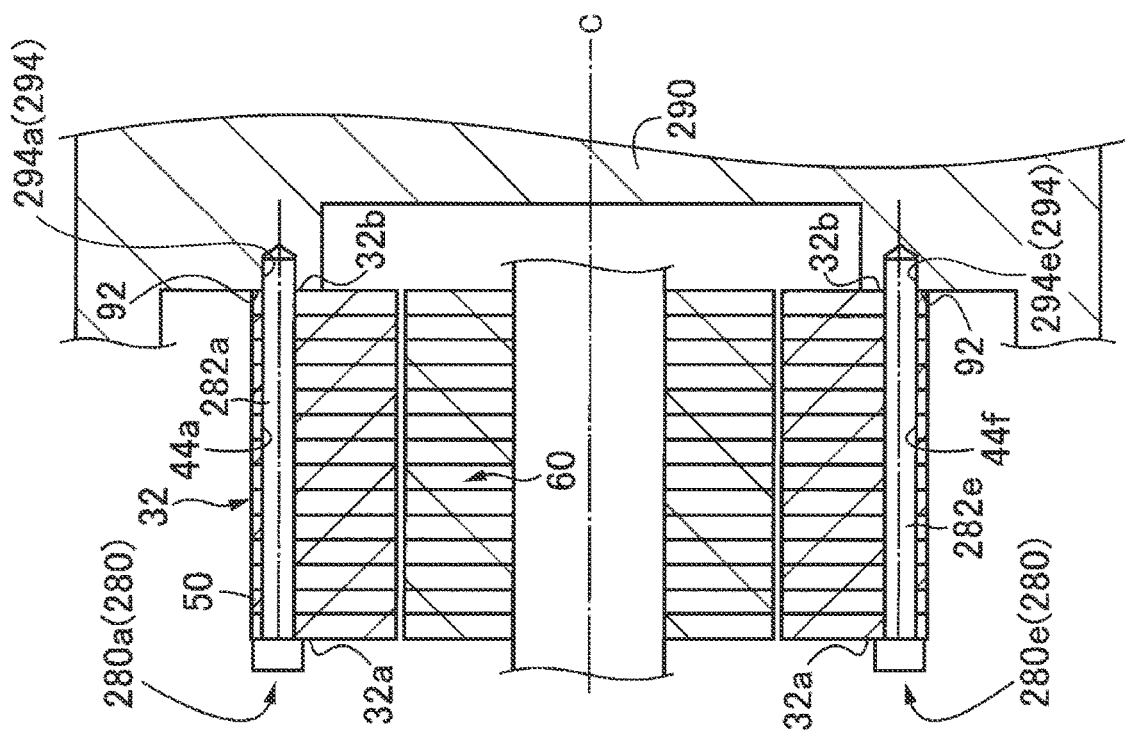
FIG. 5B is a cross-sectional view of a mounting structure of an electric motor to a case according to the third embodiment, and is a cross-sectional view in the direction of the axis.
Figure 5A:
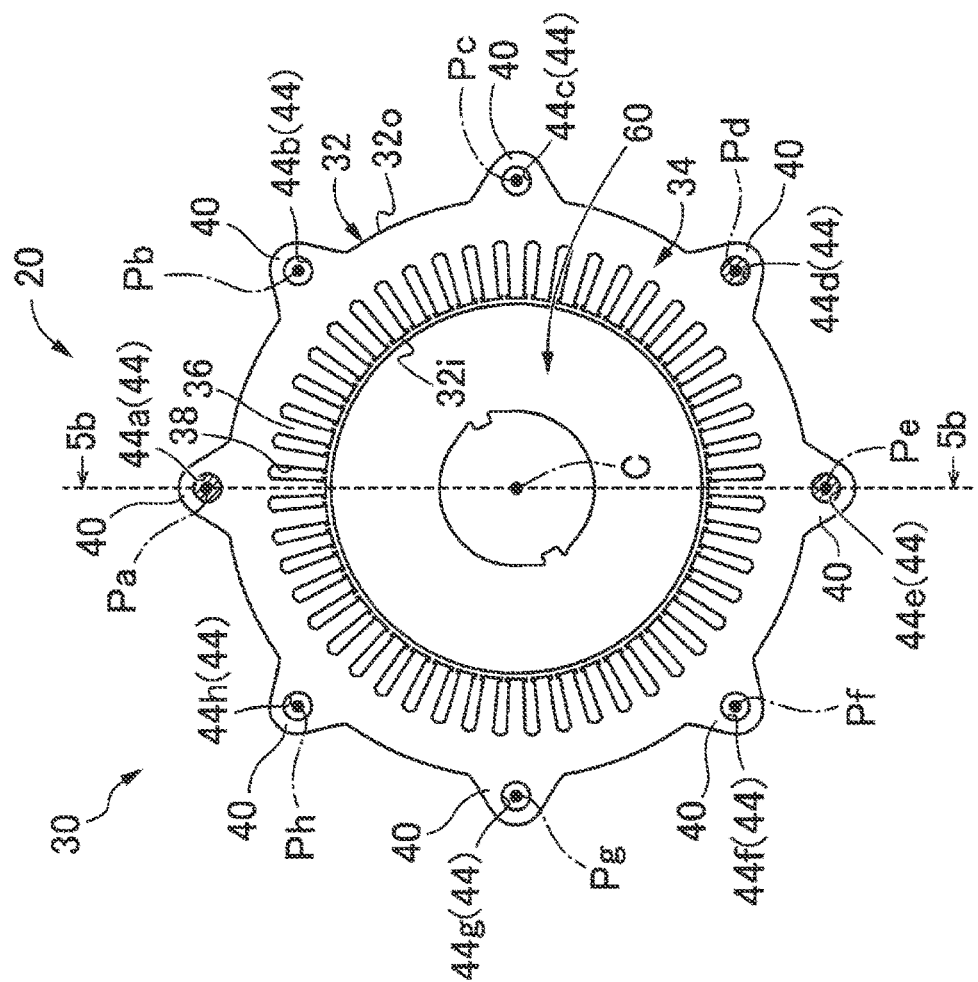
FIG. 5A is a cross-sectional view of a mounting structure of an electric motor to a case according to a third embodiment, and is a radial cross-sectional view.

FIGS. 5A and 5B are cross-sectional views of a mounting structure for mounting the electric motor 20 to a case 290 according to a third embodiment, wherein FIG. 5A is a cross-sectional view in a radial direction, and FIG. 5B is a cross-sectional view in the direction of the axis C. The mounting structure for mounting the electric motor 20 to the case 290 according to the present embodiment is substantially the same as the mounting structure for mounting the electric motor 20 to the case 90 according to the first embodiment described above. Therefore, in the present embodiment, portions different from those of the first embodiment will be mainly described, and portions substantially the same as those of the first embodiment will be denoted by the same reference numerals, and description thereof will be omitted as appropriate.

FIG. 5B is a cross-sectional view taken along 5b-5b of the cut line shown in FIG. 5A. In FIG. 5A, the case 290 and the bolt 280 are not illustrated.

In the present embodiment, the case 90 and the bolt 80 in the first embodiment are replaced with the case 290 and the bolt 280, respectively. The outside diameters D of the shaft portions 282 of the bolts 280 inserted through the fastening holes 44x are all the same, and the axial forces F of the bolts 280 when the stator core 32 is mounted to the case 290 are all the same. In addition, the thicknesses TH of the case 290 at the fastening positions, that is, at the positions of the locking holes 294x are the same, and the radial lengths L of the thick regions at the positions of the locking holes 294x are the same.

In the present embodiment, the fastening holes 44x are holes 44a, 44d, 44e, and the dummy holes 44y are holes 44b, 44c, 44f, 44g, 44h. Further, the locking holes 294x are holes 294a, 294d, 294e, and the non-locking holes 294y are holes 294b, 294c, 294f, 294g, 294h. In FIGS. 5A and 5B, the fastening holes 44x are shaded.

As viewed in the direction of the axis C, the angular intervals between adjacent ones of the fastening holes 44x about the axis C (hereinafter simply referred to as "angular intervals") are different from each other. Specifically, the angular interval between the hole 44a and the hole 44d, the angular interval between the hole 44d and the hole 44e, and the angular interval between the hole 44e and the hole 44a are $\frac{3}{8}\pi$ [rad], $\frac{1}{8}\pi$ [rad], and $\frac{4}{8}\pi$ [rad], respectively. As a result, symmetry of the radial rigidity of the stator core 32 mounted to the case 290 about the axis C is broken.

For example, in the case where the plurality of holes 44 are eight or more, only three of the plurality of holes 44 are the fastening holes 44x and the remaining holes are the dummy holes 44y, the stator core 32 is stably fastened to the case 290 with a minimum number of bolts 280, namely three bolts 280, resonances due to the annular oscillation mode is reduced as compared with the case where the angular intervals between the adjacent fastening holes 44x as viewed in the direction of the axis C are the same.

According to the present embodiment, (a) the angular intervals between the adjacent fastening holes 44x in the direction of the axis C are different from each other, (b) other than the fastening hole 44x of the plurality of holes 44 is dummy hole 44y, (c) polygon formed by connecting the adjacent fastening holes 44x in the direction of the axis C includes the axis C. As a result, the occurrence of resonance due to the annular vibration mode is suppressed, and the stator core 32 is stably fastened to the case 290.

Although the embodiments of the present disclosure have been described in detail with reference to the drawings, the present disclosure is also applied to other aspects.

In the first, second, and third embodiments described above, the stator core 32 was fastened to the case 90, 190, 290 by the bolts 80, 180, 280. However, the present disclosure is not limited to this embodiment, and may be fastened by a combination of a bolt and a nut, for example. In addition, the case 90, 190, 290 may not be provided with each of the non-locking-holes 94y, 294y.

In the first embodiment described above, when the arrangement of the fastening holes 44x is symmetrical with respect to a line passing through the axis C (for example, from lines CL1 to CL4) as viewed along the axis C, the fastening conditions between the stator core 32 and the case 90 by the bolt 80 differ from each other. However, the present disclosure is not limited to this embodiment, and may be configured such that the positions of the locking-hole 94x in the case 90 differ from each other, for example, as in Embodiment 2. As described above, when the arrangement of the fastening holes 44x is symmetrical with respect to the line passing through the axis C as viewed in the axis C, at least one of the fastened states of the stator core 32 and the case 90 by the bolts 80 different from each other and the rigidity at a plurality of fastening positions in the case 90 different from each other may be established.

In the second embodiment described above, the respective thicknesses TH at the fastening positions in the case 190 and the respective radial lengths L of the thick regions in the case 190 are different from each other. The present disclosure is not limited to this, and may be a mode in which either one of the thickness TH and the length L is different, for example.

In the first, second and third embodiments described above, symmetry of the radial rigidity of the stator core 32 mounted to the case 90, 190, 290 about the axis C is broken. In the first embodiment, the fastened states of the stator core 32 and the case 90 by the bolts 80 are different from each other. In the second embodiment, the stator core 32 is fastened to the case 190 by the bolts 180 so that the positions of the locking holes 194x are different from each other. In the third embodiment, the angular intervals between adjacent ones of the fastening holes 44x as viewed in the direction of the axis C are different fro each other. However, the present disclosure is not limited to this embodiment. For example, the above-described fastened states may be different from each other, the positions of the locking holes in the case may be different from each other, and the angular intervals between adjacent ones of the fastening holes 44x may be different from each other, so that symmetry of the radial rigidity of the stator core 32 mounted to the case about the axis C is broken.

It is to be noted that the above-described embodiments are merely examples of the present disclosure, and the present disclosure can be implemented in various modifications and improvements based on the knowledge of a person skilled in the art without departing from the gist of the present disclosure.

What is claimed is:

1. A mounting structure for an electric motor, the electric motor comprising:
   a stator core having a cylindrical shape about an axis and having a plurality of teeth in an inner peripheral portion of the stator core and eight holes formed on an outer peripheral portion of the stator core, the eight holes being located at equal angular intervals about the axis; and
   a case housing the stator core, the case including a cylindrical wall and a bottom part that closes one axial end of the case, the bottom part having a mounting surface on an inner side thereof, wherein:
   the stator core is fastened to the case by three bolts inserted through a first hole, a second hole, and a third hole among the eight holes, the three bolts are fastened at corresponding three fastening positions on the mounting surface of the case;
   symmetry of radial rigidity of the stator core about the axis in a state in which the stator core is mounted to the case is broken due to at least one of (i) different fastened states between the stator core and the case at the three fastening positions; and (ii) different rigidities of the case at the three fastening positions;
   a polygon formed by connecting the first hole, the second hole, and the third hole as viewed in the direction of the axis includes the axis;
   among the remaining five holes of the eight holes other than the first hole, the second hole, and the third hole, a first pair of two holes are provided between the first hole and the second hole, one hole is provided between the second hole and the third hole, and a second pair of two holes are provided between the third hole and the first hole;
   the bottom part includes thick regions at each of the three fastening positions, the thick regions having a thickness in the direction of the axis greater than a thickness of an adjacent radially inward region of the bottom part; and
   the thick regions have different thicknesses from each other.

2. The mounting structure according to claim 1, wherein the symmetry of the radial rigidity of the stator core about the axis in the state in which the stator core is mounted to the case is broken due to either or both of the following: the fastened states between the stator core and the case by the three bolts are different from each other; and the rigidities of the case at the fastening positions are different from each other.

3. The mounting structure according to claim 1, wherein the fastened states between the stator core and the case by the three bolts are different from each other due to either of both of the following: outside diameters of the three bolts inserted through the first hole, the second hole, and the third hole are different from each other; and axial forces on the three bolts inserted through the first hole, the second hole, and the third hole are different from each other.

4. The mounting structure according to claim 1, wherein the rigidities of the end case at the fastening positions are different from each other due to radial lengths of the thick regions of the case at the fastening positions are different from each other.

5. The mounting structure according to claim 1, wherein at least one of the thick regions projects outward in the direction of the axis.

6. The mounting structure according to claim 1, wherein the three holes are configured as fastening holes into which the three bolts are inserted to fasten the stator core and the case, and the remaining five holes are configured as non-fastening holes which are distinct from the fastening holes.

7. The mounting structure according to claim 1, wherein the three bolts include a first bolt inserted into the first hole, a second bolt inserted into the second hole, and a third bolt inserted into the third hole, and a thickness of the thick regions at a fastening position of the first bolt is smaller than a thickness of the thick regions at a fastening position of the third bolt.

* * * * *